US011942241B2

(12) United States Patent
Dostal

(10) Patent No.: US 11,942,241 B2
(45) Date of Patent: Mar. 26, 2024

(54) ELECTRIC CABLE

(71) Applicant: Lubomir Dostal, Winchester, MA (US)

(72) Inventor: Lubomir Dostal, Winchester, MA (US)

( * ) Notice: Subject to any disclaimer, the term of this patent is extended or adjusted under 35 U.S.C. 154(b) by 302 days.

(21) Appl. No.: 17/325,317

(22) Filed: May 20, 2021

(65) Prior Publication Data

US 2022/0375651 A1 Nov. 24, 2022

(51) Int. Cl.
*H01B 13/26* (2006.01)
*H01B 7/30* (2006.01)
*H01B 9/02* (2006.01)

(52) U.S. Cl.
CPC ................. *H01B 7/30* (2013.01); *H01B 9/02* (2013.01); *H01B 13/26* (2013.01)

(58) Field of Classification Search
CPC ............. H01B 13/26; H01B 7/30; H01B 9/02
USPC ....................................................... 174/110 R
See application file for complete search history.

(56) References Cited

U.S. PATENT DOCUMENTS 1,765,607 A 6/1930 Ohl
2,680,218 A 6/1954 Keroes
2,886,631 A * 5/1959 Muller .................. H01B 7/226 174/115
3,193,627 A 7/1965 Hecht
3,261,907 A 7/1966 Morrison
3,538,441 A * 11/1970 Takashi .................... H01Q 1/24 343/702
3,935,399 A 1/1976 Lian
5,518,849 A * 5/1996 Sato ..................... G03G 9/1075 430/111.31
5,622,509 A * 4/1997 Smythe ................ H01R 13/652 439/106
5,926,949 A 7/1999 Moe et al.
6,697,495 B1 2/2004 Youn
7,466,833 B2 12/2008 Lee et al.
8,804,994 B2 8/2014 Alvarez Ibarra
2001/0018621 A1 8/2001 Weikel et al.
2010/0308463 A1* 12/2010 Yu ..................... H01L 21/02074 257/E23.141

(Continued)

FOREIGN PATENT DOCUMENTS

CN 2312548 Y 3/1999
CN 201760683 U 3/2011

(Continued)

OTHER PUBLICATIONS

Copper Wire Tables_U.S.Dept of Commerce_pp. 1 to 41_1966.*

*Primary Examiner* — Timothy J Thompson
*Assistant Examiner* — Guillermo J Egoavil
(74) *Attorney, Agent, or Firm* — Lambert Shortell & Connaughton; David J. Connaughton, Jr.; Justin P. Tinger

(57) ABSTRACT

An improved electric cable is disclosed herein. The resistance of the electric cable of the present disclosure is surprisingly decreased despite a reduction in the cross-sectional area of the conductor when at least one metal slug is positioned at an end of the cable. Conductor wires, which may or may not be individually insulated, may extend around a metal slug or through an aperture of the slug. In combination with at least one metal slug, the cross-sectional area of individual wires or the amount of wires within a stranded wire cable may be substantially reduced without seeing an expected proportionate increase in electrical resistance, and surprisingly, a decrease in resistance may be observed.

18 Claims, 3 Drawing Sheets

(56) References Cited

U.S. PATENT DOCUMENTS

| | | | | |
|---|---|---|---|---|
| 2011/0045399 | A1* | 2/2011 | Shoji | G03G 9/1132 430/124.1 |
| 2013/0181520 | A1* | 7/2013 | Tsuji | H02M 1/126 307/31 |
| 2014/0105311 | A1 | 4/2014 | Agusti Costa et al. | |
| 2017/0214182 | A1* | 7/2017 | Gilliland | H01R 13/42 |
| 2018/0252553 | A1* | 9/2018 | Daniels | G01D 5/2291 |
| 2020/0323052 | A1 | 10/2020 | Shenzhen | |

FOREIGN PATENT DOCUMENTS

| | | | | | |
|---|---|---|---|---|---|
| CN | 105810349 | A | | 7/2016 | |
| DE | 102011057047 | A1 | | 6/2013 | |
| JP | 2007129687 | A | * | 5/2007 | H01F 17/06 |
| WO | WO-2007045345 | A1 | * | 4/2007 | H01B 9/003 |
| WO | 2021009652 | A1 | | 1/2021 | |

* cited by examiner

ELECTRIC CABLE

BACKGROUND

Technical Field

The present disclosure relates generally to electric cables. More particularly, the present disclosure relates to an improved electric cable having at least one metal slug at an end of the cable, which may result in decreased resistance to electric flow within the conductor of any type of electric cable.

Description of Related Art

In the late 1800s electric cables were developed with the advent of electricity earlier in that century. Electric cables of all shapes, sizes, and varying materials known in the art today are capable of being used for a countless number of applications ranging from transmission of high-voltage electricity through long-distance power cables to transmitting audio data or information in the form of electricity from a computer, cellphone, or other device to headphones or earbuds.

Electric cables utilize a conductor or conducting wire or wires typically made from a metal material, usually copper. Conductors may be single/solid strand or multi-stranded/stranded, and any given electric cable may contain numerous conductors of the same or different metals. The conductors within the electric cable are typically individually insulated with an inner insulator made from a dielectric material, typically polytetrafluoroethylene ("Teflon") or polyethylene ("PE"). The inner insulator or insulators are typically covered with a layer of metallic shielding. Finally, most electric cables have an outer insulator, jacket, or sheath made from polyvinyl chloride ("PVC") or other similar material.

The multiple layers of insulation help protect the conductors within electric cables from being destroyed or influenced by other electric or magnetic signals. Additionally, conductors being individually insulated within an electric cable help keep the electric flow within each conductor separate from another, which tends to decrease an electric cable's overall resistance to electric current or electric flow within the cable.

There are several factors that affect an electric cable's resistance to electric flow, and a countless number of potential solutions to decrease resistance and improve the overall conducting capacity of an electric cable.

Therefore, what is needed is an improved electric cable having the following characteristics and benefits over the prior art.

SUMMARY

The subject matter of this application may involve, in some cases, interrelated products, alternative solutions to a particular problem, and/or a plurality of different uses of a single system or article.

It is an object of the present disclosure to provide an improved electric cable that may be utilized in a countless number of ways. It is another object of the present disclosure to provide an improved electric cable, specifically for use in conjunction with visual or audio cables, where the quality of the images or the sounds produced from a connection between a visual or audio device and a connector or connectors on the electric cable is enhanced.

In one aspect of the present disclosure, an electric cable is formed using at least one layer of insulation or shielding, wherein the layer or layers of insulation or shielding cover, wholly or partially, at least one neutral wire and at least one live wire. In this aspect, the electric cable utilizes at least one piece of metal or metal slug at an end of the cable, wherein the neutral wire or wires and the live wire or wires extend around the piece or slug of metal.

In another aspect of the present disclosure, an electric cable is formed using at least one layer of insulation or shielding having a cross-sectional area and a length, wherein the layer or layers of insulation or shielding cover, wholly or partially, at least one neutral wire and at least one live wire, which have lengths greater than or equal to the length of at least one of the layer or layers of insulation or shielding. In this aspect, the electric cable utilizes at least two pieces of metal or two metal slugs positioned at opposite ends of the cable, wherein at least one of the neutral wire or wires or the live wire or wires makes electric contact with at least one of the pieces or slugs of metal.

It should be understood that the various elements of the present disclosure utilized in different embodiments may be of varying sizes, shapes, lengths, or otherwise dimensions without straying from the scope of the present invention.

DETAILED DESCRIPTION

Figure 1:
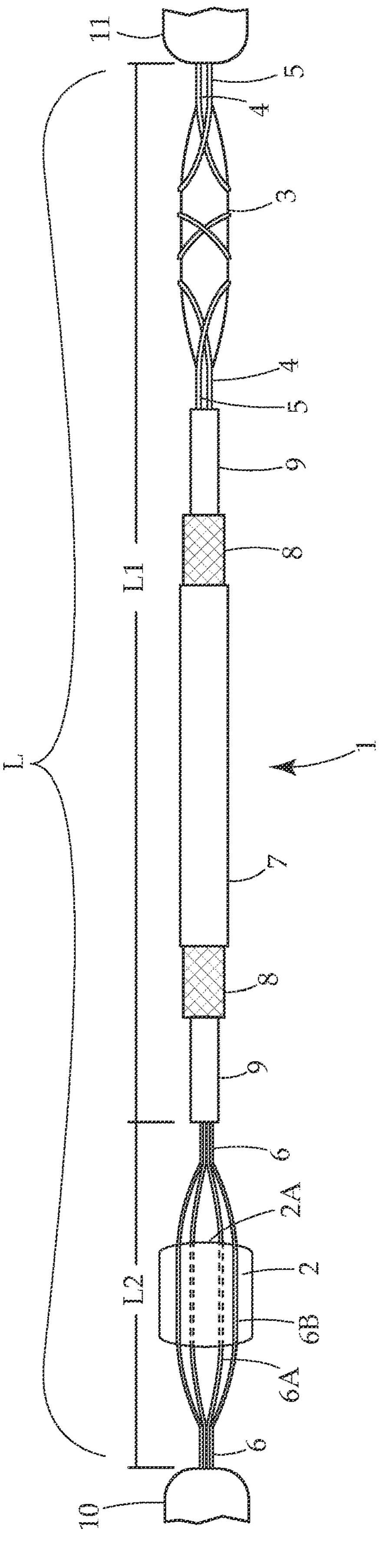
FIG. 1 provides a perspective view of an embodiment of the present disclosure.

The detailed description set forth below in connection with the appended drawings is intended as a description of presently preferred embodiments of the invention and does not represent the only forms in which the present disclosure may be constructed and/or utilized. The description sets forth the functions and the sequence of steps for constructing and operating the invention in connection with the illustrated embodiments.

Generally, the present disclosure concerns an improved electric cable combined with at least one metal slug at an end of the cable, which allows the overall cross-sectional area of the conductors within the cable to be decreased without observing, at a minimum, a proportional increase in the resistance of the cable. The embodiments described herein may not only prevent an increase to the resistance of the cable, but they may also decrease the resistance of the cable despite a decrease to the overall cross-sectional area of the conductors within the cable. The embodiments described herein may be used in a countless number of applications or ways and may specifically be used in conjunction with visual or audio devices to enhance the quality of the images or sounds produced by such devices.

In some embodiments, the electric cable may comprise a single layer of insulation having a cross-sectional area and length covering, at least partially, at least one neutral conductor or wire and one live conductor or wire and at least one metal slug positioned at an end of the cable. In other embodiments, the electric cable may comprise at least one layer of insulation or shielding having a cross-sectional area and length. The metal slug and the wires may be made from a metal material, preferably copper; however, other metals may be utilized. For example, in some embodiments the metal slug may be made from silver, and the wires may be made from copper. In other embodiments, the wires and the metal slug may both be made from copper. The neutral wires and live wires necessarily have a smaller cross-sectional area than the cross-sectional area of the singular layer of insulation, since the wires must fit inside the insulating layer. However, the wires may have a length greater than or equal to the length of the single insulation layer. In these embodiments, the single layer of insulation may comprise a dielectric insulator, such as Teflon or PE. The live wire or wires and the neutral wire or wires may extend around or past the metal slug, and at least one of the wires may make electric contact with the slug.

In most embodiments, the electric cable may comprise multiple layers of insulation or shielding, wherein each layer of insulation or shielding has a cross-sectional area and length. The several layers of insulation or shielding may cover, wholly or partially, at least one neutral wire and at least one live wire, wherein the neutral wire or wires and the live wire or wires are connected to a first connector at an end of each of the wires and connected to a second connector at an opposite end of each of the wires. In these embodiments, at least one metal slug may be positioned between the neutral and live wires at an end of the cable closer to either the first connector or the second connector and may make electric contact with one of the wires.

In some embodiments, the electric cable may comprise an outer insulator or jacket covering, wholly or partially, a layer of shielding or a shield, which in turn covers, wholly or partially, at least one neutral wire and at least one live wire, each individually covered by an inner insulator, which may comprise a dielectric material. In these embodiments, as in most other embodiments, each preceding layer of insulators or shields may have a greater cross-sectional area than each successive layer of insulators, shields, or conductors in order for the layers to properly cover each other, at least partially. For example, in these embodiments, as in most other embodiments, the wires or conductors have the smallest cross-sectional area and, consequently, may have a smaller cross-sectional area than the inner insulator covering them. Similarly, the outer insulator or jacket may have a greater cross-sectional area than the shield it covers.

Unlike the tapering relationship between the cross-sectional areas of the various layers of insulators, shields, and conductors, the lengths of each of the aforementioned elements may vary quite a bit depending on the embodiment. For example, in some embodiments, the lengths of the wires may be greater than the lengths of the insulating or shielding layers. In other embodiments, wherein the neutral and live wires are individually insulated with a dielectric material, the lengths of the wires may be equal to or only slightly greater than the dielectric insulator, and the dielectric insulator individually covering each wire may have a greater length than the shield and the outer jacket.

Depending on the embodiment, at least one metal slug may have a cross-sectional area greater than, equal to, or less than the cross-sectional area of the cable. In some embodiments, the metal slug may have a cross-sectional area greater than the cross-sectional area of at least one of the insulators or shields. In other embodiments, the metal slug may have a cross-sectional area at least five times greater than the cross-sectional area of at least one wire within the cable. For example, the metal slug may have a greater cross-sectional area than the wires and the inner dielectric insulator or insulators, which may cover at least one neutral wire and at least one live wire individually or together, but the metal slug may have a smaller cross-sectional area than the shield, the outer jacket, or both. The differential cross-sectional areas between the metal slug and outer insulator or shield may allow these layers to cover both the metal slug and the inner insulator covering the wires of the cable. For example, in the embodiments where the metal slug has a greater cross-sectional area than the inner insulator or insulators but a smaller cross-sectional area than the outer insulator and the shield, the shield, the outer insulator, or both may extend over both the metal slug and the inner dielectric insulator or insulators containing the wires.

In other embodiments, the metal slug may define an aperture extending through the metal slug, wherein a wire or wires, which may or may not be covered by a dielectric insulator or insulators, may extend through the aperture of the metal slug or around the outside of the metal slug, alternatively or simultaneously. In some embodiments, wherein the metal slug defines an aperture with wires passing or extending through the aperture or around the metal slug, the metal slug and the aperture of the metal slug necessarily have a cross-sectional area greater than at least the individual wires and the inner dielectric insulator or insulators covering the wires; however, the metal slug may have a cross-sectional area less than at least one of the shield or the outer insulator, which may allow at least one of the shield or the outer insulator to extend over both the metal slug and the dielectrically insulated wires. In this way, the metal slug may be contained within the electric cable. In other embodiments, the metal slug may be integrally formed into the electric cable. In some embodiments, the metal slug may be a molded piece integral with a wire. The metal slug may be molded into at least one wire within the cable through processes which may be known in the art, such as welding or soldering the metal slug to a wire or wires.

In some embodiments, the electric cable comprises stranded wires, which may comprise a plurality of neutral wires and a plurality of live wires. In the embodiments wherein the metal slug comprises an aperture, the stranded wires may extend through the aperture or around the metal slug, alternatively or simultaneously. In some embodiments, pluralities of live wires and pluralities of neutral wires may be grouped or stranded together and individually insulated with dielectric insulation, separating live strands from neutral strands. The strands may extend around the metal slug, through an aperture of the metal slug, or both, depending on the embodiment. The stranded wires, which may or may not be individually insulated with an inner insulator in separate strands of live and neutral wires, may be covered, wholly or partially, by at least one of a dielectric insulator, a shield, or an outer insulator or jacket.

In some embodiments, the electric cable comprises at least two metal slugs, wherein at least one metal slug is positioned at an end of the cable and at least one other metal slug is positioned at an opposite end of the cable. In some embodiments comprising at least two metal slugs, at least one of the metal slugs may have a cross-sectional area greater than the cross-sectional area of at least one of the insulators, shield, or wires/conductors, and at least one metal slug may define an aperture extending through the slug. The metal slug comprising a greater cross-sectional area than at least one of the layers of insulators, shields, or wires/conductors and the metal slug defining the aperture may or may not be the same metal slug. In other embodiments, wherein the cable comprises a first connector and a second connector attached to opposite ends of the wires, at least one of the connectors may define a housing that extends into the connector, wherein at least one of the metal slugs may be placed. At least one of the connectors may also define an aperture extending into the connector or connectors, wherein the wire or wire may extend through the aperture. The metal slug placed within the housing may or may not comprise a cross-sectional area greater than at least one of the layers of insulation or shielding and may or may not define an aperture extending through the slug. A wire or wires may extend around the slug placed within the housing, through an aperture of the slug placed within the housing, or both and extend further into the connector. The wire or wires extending through the aperture of at least one connector and the wire or wires extending through the housing of the same connector may or may not physically touch within the connector. In many embodiments, the wires or strands of wires are individually insulated from other wires or separate strands of wires.

In another embodiment, a method of creating the electric cable is utilized comprising the steps of providing an electric cable; removing wires or strands of wires, wherein the wires or strands of wires may be individually insulated or not, from the cable; placing at least one metal slug between the remaining wire or wires at an end of the cable; extending the remaining wire or wires past the slug and connecting the wire or wires to at least one connector. In other embodiments, the method may comprise the step of connecting the wire or wires to at least one connector by soldering the wires to an electrical point within the connector. In other embodiments, the method may comprise the step of gluing the metal slug to a wire or wires, which may or may not be individually insulated. In other embodiments, the method may comprise the step of extending at least one layer of insulation or shielding over the metal slug and the wires.

In another embodiment, the method of creating the electric cable may comprise the steps of placing at least two metal slugs between the wire or wires at opposite ends of the cable/wires; extending opposite ends of the cable/wires past the slugs; and connecting the wire or wires to at least two connectors. In other embodiments, the method may comprise the step of creating a housing with at least one connector and placing at least one of the metal slug, a wire, or wires within the housing.

Turning now to FIG. 1, which shows an embodiment of the electric cable 1. The electric cable 1 has a length L and comprises stranded wires 6 that run the entire length L of the cable 1 or just a portion of the length $L_2$ or $L_1$ of the cable 1. The pluralities of wires 6 are composed of live wires and of neutral wires, which may be grouped or stranded together and individually insulated with dielectric insulation, separating live strands from neutral strands. The electric cable 1 has at least one layer of insulation or shielding covering the wiring within the cable 1. In the embodiment shown, the electric cable 1 comprises an outer insulator 7, a shield 8, and an inner insulator 9. The outer insulator 7, the shield 8, or the inner insulator 9 runs the entire length L of the cable 1 or just a portion of the length $L_1$ or $L_2$ of the cable 1. The electric cable 1 comprises two metal slugs 2 and 3 on opposite ends of the cable 1. One metal slug 2 is positioned at a first end of the cable 1, and the other metal slug 3 is positioned at a second end of the cable 1. At least one slug 2 has a cross-sectional area greater than the cross-sectional area of the cable 1. The metal slug 2 defines an aperture 2A for stranded wires 6A to extend through. Alternatively, or simultaneously, stranded wires 6B extend or pass around the outside of the slug 2. The stranded wires 6A and 6B passing or extending around the outside of the slug 2 may or may not make electrical contact with the slug 2. At an opposite end of the cable 1, the metal slug 3 has a cross-sectional area less than that cross-sectional area of the cable 1. At least two wires, a neutral wire 4 and a live wire 5, which are electrically connected to the stranded wires 6 within the cable 1, may extend past or through (shown in FIG. 3) the metal slug 3. However, in the embodiment shown, the neutral wire 4 and the live wire 5 make physical contact with the slug 3 but only one of the wires 4 or 5 makes electrical contact. In the embodiment shown, when physical contact between the two wires 4 and 5 and the slug 3 is made, neutral wire 4 and live wire 5 are wrapped or twisted around the slug 3. Neutral wire 4 and live wire 5 may run the entire length L of the cable 1 or just a portion of the length $L_1$ or $L_2$ of the cable 1. In the embodiment shown, the stranded wires 6 are connected to a first connector 10 at one end of the cable 1, and the neutral wire 4 and live wire 5 are connected to a second connector 11 at an opposite end of the cable 1. The first connector 10 and the second connector 11 may comprise any of the following structures, including without limitation: a power plug, such as an AC or DC power plug connectable to a wall socket, an audio jack connector/adapter, an audio minijack connector/adapter, an RCA connector/adapter, an XLR connector/adapter, a Speakon connector/adapter, an HDMI connector/adapter, a USB connector/adapter, a Lightning connector/adapter, a computer or screen power connector/adapter, an amplifier power connector/adapter, or a transducer, such as audio headphones/earbuds. In some embodiments, the first connector 10 is a power plug and the second connector 11 is an amplifier power connector. In other embodiments, both the first connector 10 and the second connector 11 are Speakon connectors. It should be expressly noted that the aforementioned embodiments and structures are meant as examples and should not be construed as limiting the scope of the present disclosure.

Figure 2:
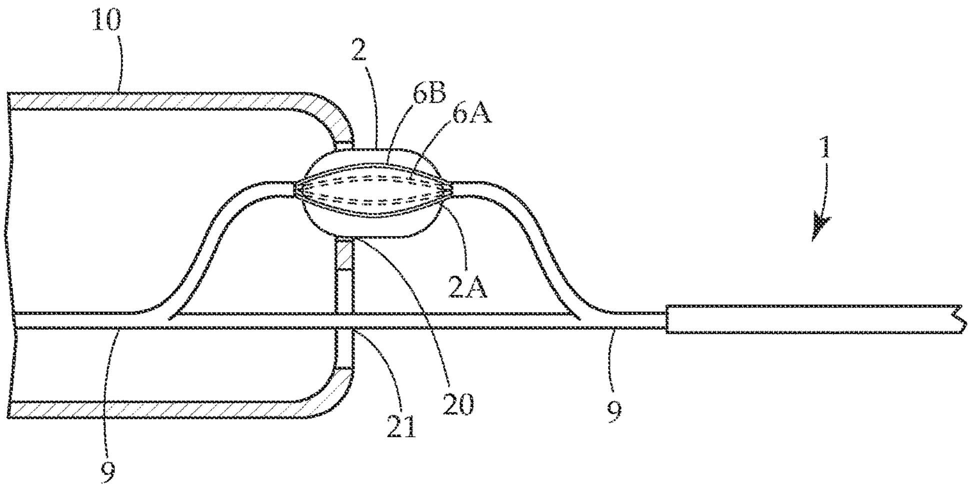
FIG. 2 provides a perspective view of another embodiment of the present disclosure.

FIG. 2 shows an embodiment of the electric cable 1, wherein the first connector 10 contains a housing 20, wherein the metal slug 2, having a cross-sectional area greater than the cross-sectional area of the cable 1, is placed or encased. The metal slug may be partially or wholly encased within the housing. The housing 20 comprises a cross-sectional area greater than the cross-sectional area of the slug 2 in order for stranded wires 6B, which are wrapped around the outside of the slug 2, to fit in the housing 20 simultaneously with the slug 2. In the embodiment shown, inner insulator 9, which covers stranded wires 6 (shown in FIG. 1), runs through an aperture 21 in the first connector 10 and stranded wires 6A run through an aperture 2A in the slug 2. In the embodiment shown, inner insulator 9, containing stranded wires 6, splits both outside and inside the first connector 10. The split portion of inner insulator 9 outside the first connector 10 extends and terminates upon reaching one end of the slug 2. The split portion of the inner insulator 9 inside the first connector 10 extends and terminates upon reaching an opposite end of the slug 2. The stranded wires 6A that pass through the aperture 2A of the slug 2, the stranded wires 6B that pass around the outside of the slug 2, and the stranded wires 6 (shown in FIG. 1) covered by inner insulator 9 are all the same wires. In some embodiments (not shown), stranded wires 6, 6A, and 6B may be individually insulated with at least one layer of insulation or shielding.

Figure 3:
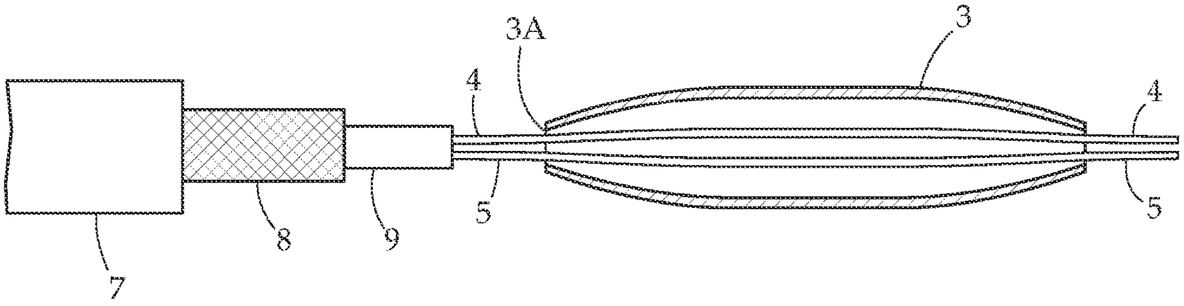
FIG. 3 provides a perspective view of yet another embodiment of the present disclosure.

FIG. 3 shows an embodiment of the present disclosure comprising three layers of insulation or shielding. This embodiment comprises an outer insulator 7, a shield 8, and an inner insulator 9. The outer insulator 7 encompasses the shield 8 and, thus has a slightly larger cross-sectional area than the cross-sectional area of the shield 8. Similarly, the shield 8 encompasses the inner insulator 9 and, thus has a slightly larger cross-sectional area than the cross-sectional area of the inner insulator 9. In the embodiment shown, neutral wire 4 and live wire 5 run through inner insulator 9 and through an aperture 3A defined in the metal slug 3. Only one of the wires 4 or 5 makes electrical contact with the slug 3. The slug 3 has a cross-sectional area greater than both the inner insulator 9 and the shield 8 but has a cross-sectional area slightly less than the cross-sectional area of the outer insulator 7. In the embodiment shown, the aperture 3A has a cross-sectional area less than the inner insulator 9, the shield 8, the outer insulator 7, and the slug 3, but has a cross-sectional area greater than the cross-sectional area of both neutral wire 4 and live wire 5. The differential cross-sectional areas between the aperture 3A, the slug 3, and the plurality of layers of insulation or shielding allow different layers of insulation, shielding, or wiring to extend into the aperture 3A or over the slug 3. For example, the outer insulator 7 may extend over and cover the slug 3 while, simultaneously or alternatively, the shield 8 and the inner insulator 9 may extend and terminate at the aperture 3A. In some embodiments (not shown), the neutral wire 4 and live wire 5 may be individually insulated with at least one layer of insulation or shielding.

Figure 4:
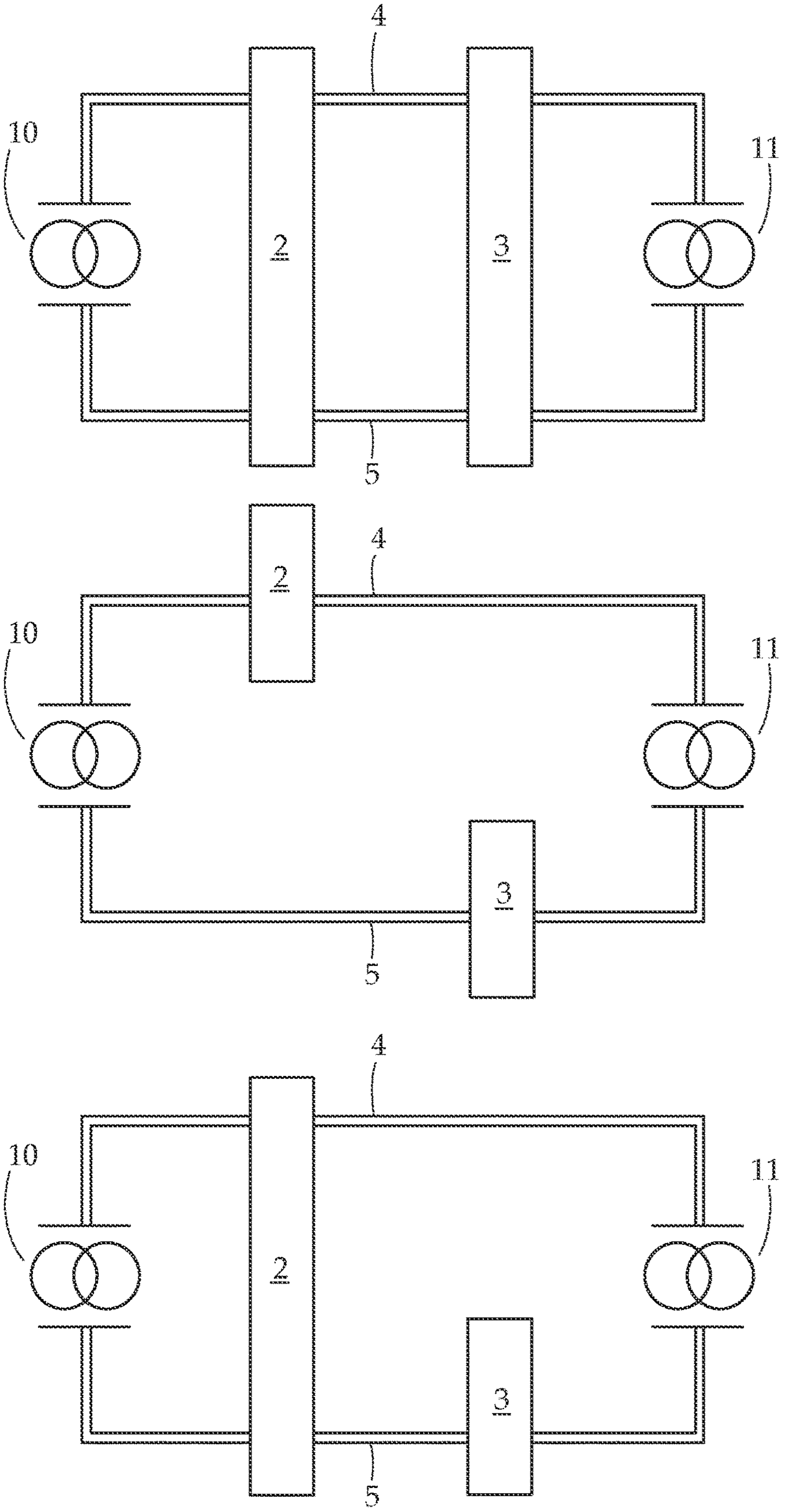
FIG. 4 provides a perspective view of several embodiments of the present disclosure represented in different electrical circuit diagrams.

FIG. 4 shows several embodiments of the present disclosure represented in several different circuit diagrams. In each of the circuit diagrams, first connector 10 may be electrically connected to, without limitation, a power source or transducer, and second connector 11 may be electrically connected to, without limitation, a power source or transducer. Every potential electrical connection that the first connector 10 and the second connector 11 can form is represented by the same symbol in each circuit diagram. In each diagram, live wire 5 carries voltage, electrical current, electrical signals, and/or electrons from either first connector 10 or second connector 11 to the opposite connector 10 or 11, and neutral wire 4 carries voltage, electrical current, electrical signals, and/or electrons from the opposite connector 10 or 11 back to either first connector 10 or second connector 11 in order to complete an electrical circuit. A power source may be provided by a wall outlet or power strip, and a transducer may be any device that transforms energy of one kind into energy of another kind. For example, a transducer may convert electrical energy into sound waves or visual images depending on the device and which embodiment of the electric cable and connectors are utilized. Without limiting the types of transducers that may be utilized in conjunction with the present disclosure, such transducers may comprise speakers, amplifiers, computer screens, or televisions.

Each diagram also represents different embodiments of the metal slugs 2 and 3. In most embodiments, represented in each diagram in FIG. 4, metal slugs 2 and 3 are not elements of the electrical circuit created between the connection of the first connector 10, the connection of the second connector 11, and completed by live wire 5 and neutral wire 4, due to live wire 5 and neutral wire 4 being individually insulated with a dielectric material. Rather, in each embodiment represented, metal slugs 2 or 3 may exist outside of the circuit or may be part of the wires 4 or 5, and only one of the wires 4 or 5 makes electrical contact with the same slug 2 or 3. The diagrams where either of the metal slugs 2 or 3 are represented by a rectangular shape that covers both live wire and neutral wire 4, represent embodiments of the present disclosure where at least one live wire 5 and at least one neutral wire 4 run through an aperture (not shown) of either slug 2 or 3. Similarly, the parts of the diagrams where either of the metal slugs 2 or 3 are represented by a square shape touching live wire 5 or neutral wire 4, represent embodiments of the present disclosure where the live wire 5 or neutral wire 4 make electrical contact with the slugs 2 or 3, respectively, and at least one live wire 5 or at least one neutral wire 4 pass around or extend over the outside of either slug 2 or 3, with or without making physical contact with the slug 2 or 3. It should be expressly noted that nothing in the diagrams shown in FIG. 4 should be construed or understood as limiting the size, length, shape, or otherwise dimensions of any of the metal slugs 2 and 3, the connectors 10 and 11, or the wires 4 and 5.

While several variations of the present disclosure have been illustrated by way of example in preferred or particular embodiments, it is apparent that further embodiments could be developed within the spirit and scope of the present disclosure, or the inventive concept thereof. However, it is to be expressly understood that such modifications and adaptations are within the spirit and scope of the present disclosure, and are inclusive, but not limited to the following appended claims as set forth below.

What is claimed is:

1. An electric cable comprising:
- at least one layer of insulation or shielding having a cross-sectional area and a length;
- wherein, the at least one layer of insulation or shielding covers, wholly or partially, at least one neutral wire and at least one live wire, wherein, the wires comprise at least one type of metal having a cross-sectional area and a length; and
- at least one metal slug at an end of the cable, wherein the neutral wire and the live wire extend past the at least one metal slug;
- wherein one of the at least one neutral wire or the at least one live wire make electrical contact with the at least one metal slug;
- wherein the at least one metal slug comprises either silver or copper; and
- the metal slug does not increase a resistance of the wires to an electric flow.

2. An electric cable comprising:
- at least one layer of insulation or shielding having a cross-sectional area and a length;
- wherein, the at least one layer of insulation or shielding covers, wholly or partially, at least one neutral wire and at least one live wire, wherein, the wires comprise at least one type of metal having a cross-sectional area and a length; and
- at least one metal slug at an end of the cable, wherein the neutral wire and the live wire extend past the at least one metal slug;
- wherein one of the at least one neutral wire or the at least one live wire make electrical contact with the metal slug; and
- wherein one of the at least one neutral wire or the at least one live wire is wrapped or twisted around the outside of the metal slug.

3. The electric cable of claim 1 further comprising a first connector at an end of the cable and a second connector at an opposite end of the cable, wherein opposite ends of both the at least one neutral wire and the at least one live wire are connected to the first connector and the second connector.

4. The electric cable of claim 3, wherein either the first connector or the second connector define a housing, wherein the at least one metal slug is encased within the housing.

5. The electric cable of claim 1, wherein the at least one metal slug defines an aperture extending through the at least one slug and one of the at least one neutral wire or the at least one live wire extend through the aperture.

6. The electric cable of claim 1 further comprising stranded wires, wherein the at least one layer of insulation or shielding covers, wholly or partially, the stranded wires, wherein the stranded wires comprise a plurality of neutral wires and a plurality of live wires.

7. The electric cable of claim 1, wherein the at least one neutral wire and the at least one live wire are individually insulated with at least one layer of insulation or shielding.

8. The electric cable of claim 1 further comprising an outer insulator having a cross-sectional area and a length, wherein the outer insulator covers, wholly or partially, a shield having a cross-sectional area less than the cross-sectional area of the outer insulator and a length, wherein the shield covers, wholly or partially, an inner insulator having a cross-sectional area less than the cross-sectional area of the shield and a length.

9. The electric cable of claim 1, wherein the at least one metal slug comprises a cross-sectional area greater than the cross-sectional area of at least one of the at least one layer of insulation or shielding.

10. The electric cable of claim 9, wherein the at least one metal slug comprises a cross-sectional area at least five times greater than the cross-sectional area of the at least one neutral wire or the at least one live wire.

11. The electric cable of claim 1, wherein the at least one metal slug comprises a metal different than the metal of one of the at least one neutral wire and the at least one live wire.

12. The electric cable of claim 1 further comprising two metal slugs, wherein one of the two metal slugs is positioned at a first end of the cable and the other of the two metal slugs is positioned at a second opposite end of the cable.

13. An electric cable comprising:

at least one layer of insulation or shielding having a cross-sectional area and a length;

wherein, the at least one layer of insulation or shielding covers, wholly or partially, at least one neutral wire and at least one live wire having lengths greater than or equal to the length of the at least one layer of insulation or shielding; and two metal slugs, wherein one of the metal slugs is positioned at a first end of the cable and another of the metal slugs is positioned at a second end of the cable;

wherein one of the at least one neutral wire or the at least one live wire make electrical contact with one of the two metal slugs;

wherein, at least one of the at least one neutral wire or the at least one live wire comprise an insulator covering, wholly or partially, the at least one neutral wire or the at least one live wire; and wherein a resistance of the at least one live wire to an electric flow does not increase.

14. The electric cable of claim 13, wherein at least one of the two metal slugs defines an aperture extending through the slug, the cable further comprising one of the at least one neutral wire or the at least one live wire extending through the aperture.

15. The electric cable of claim 13, wherein at least one metal slug comprises a cross-sectional area greater than the cross-sectional area of one of the at least one layer of insulation or shielding.

16. The electric cable of claim 13 further comprising a first connector at a first end of the cable and a second connector at a second end of the cable, wherein opposite ends of the at least one neutral and the at least one live wire are connected to both the first connector and the second connector.

17. The electric cable of claim 16 further comprising stranded wires, wherein the stranded wires comprise a plurality of neutral wires and a plurality of live wires and each of the stranded wires comprise at least one layer of individual insulation or shielding separating the neutral wires from the live wires and covering the stranded wires;

wherein the first connector defines a housing extending into the first connector;

wherein one metal slug defines an aperture extending through the metal slug;

wherein the stranded wires extend around the outside of the metal slug or through the aperture of the metal slug, or both; and the stranded wires extend into the housing and the metal slug is encased, wholly or partially, within the housing.

18. The electric cable of claim 17, wherein the first connector further defines an aperture extending into the first connector, wherein the stranded wires extend into the aperture.

* * * * *